United States Patent [19]

Tamura et al.

[11] Patent Number: 5,224,043
[45] Date of Patent: Jun. 29, 1993

[54] DRIVING FORCE CONTROL APPARATUS FOR MOTOR VEHICLES

[75] Inventors: Minoru Tamura; Terukiyo Murakami; Toru Iwata, all of Kanagawa, Japan

[73] Assignee: Nissan Motor Company, Limited, Yokohama, Japan

[21] Appl. No.: 654,186

[22] Filed: Feb. 12, 1991

[30] Foreign Application Priority Data

Feb. 14, 1990 [JP] Japan .................................. 2-31520

[51] Int. Cl.$^5$ .................................................. B60T 8/32
[52] U.S. Cl. .................................. 364/426.03; 180/197; 303/100
[58] Field of Search ............. 364/426.01, 426.03; 180/197; 303/100, 102

[56] References Cited

U.S. PATENT DOCUMENTS

| 4,788,644 | 11/1988 | Inagaki | 364/426.03 |
| 4,849,891 | 7/1989 | Krohn et al. | 364/426.03 |
| 4,850,446 | 7/1989 | Leiber et al. | 180/197 |
| 5,051,908 | 9/1991 | Shiraishi | 364/426.02 |
| 5,077,672 | 12/1991 | Nobumoto et al. | 364/426.03 |

FOREIGN PATENT DOCUMENTS

| 0338588 | 10/1989 | European Pat. Off. |
| 3724574A1 | 4/1988 | Fed. Rep. of Germany |
| 3724575A1 | 4/1988 | Fed. Rep. of Germany |
| 2112090 | 7/1983 | United Kingdom |

Primary Examiner—Thomas G. Black
Attorney, Agent, or Firm—Foley & Lardner

[57] ABSTRACT

A driving force control apparatus for use with an automotive vehicle supported on driving wheels and driven wheels. The apparatus is arranged to provide a driving force reduction control (traction control) to reduce the driving forces applied to the driving wheels when driving slip of the driving wheels occurs. The driving force reduction control is inhibited to minimize the tendency of the vehicle to spin when lateral slip of the driven wheels occurs.

19 Claims, 4 Drawing Sheets

DRIVING FORCE CONTROL APPARATUS FOR MOTOR VEHICLES

BACKGROUND OF THE INVENTION

This invention relates to a driving force control apparatus for use with a motor vehicle and, more particularly, to such a driving force control apparatus adapted to reduce the driving forces applied to the driving wheels when slip occurs on the part of the driving wheels.

For example, Japanese Patent Kokai No. 63-12842 discloses a driving force control apparatus installed on a front-wheel-drive type automotive vehicle for providing a driving force reduction control (traction control) to reduce the driving forces applied to the front wheels (driving wheels) when slip occurs on the part of the front wheels. For such a driving force reduction control, conditions, such as revolution speeds, of the front and rear wheels are monitored while the vehicle is traveling for use in calculating a parameter representing the degree of driving slip of the front wheels. The parameter includes the slip ratio of the front wheels, the slip ratio changing rate of the front wheels, etc. When the calculated parameter exceeds a predetermined threshold value, the driving forces applied to the front wheels are reduced to suppress the driving slip of the front wheels.

However, the prior art driving force control apparatus performs the driving force reduction control not only when slip occurs only on the front wheels, but also when slip occurs on both the front and rear wheels. A reduction of the driving forces applied to the front wheels for slip on both the front and rear wheels will cause an increase of the gripping forces of the front wheels with respect to the load surface. This, in turn, increases the cornering force and the spinning moment directed inwardly of the circle in which the vehicle is turning so as to cause the vehicle to spin about the front wheels. This is true particularly when lateral slip of the rear wheel occurs.

SUMMARY OF THE INVENTION

Therefore, it is a main object of the invention to provide an improved driving force control apparatus for use with an automotive vehicle which can decrease the spinning moment acting on the vehicle so as to minimize the tendency of the vehicle to spin when lateral force of driven wheels occurs.

There is provided, in accordance with the invention, a driving force control apparatus for use with an automotive vehicle supported on driving wheels and driven wheels. The vehicle includes an engine for applying driving forces to the driving wheels. The driving force control apparatus comprises first means sensitive to driving slip of the driving wheels for producing a first signal when driving slip is sensed, second means responsive to the first signal for performing a driving force reduction control to reduce the driving forces applied to the driving wheels so as to decrease the driving slip of the driving wheels, third means sensitive to lateral slip of the driven wheels for producing a second signal when lateral slip is sensed, and fourth means responsive to the second signal for inhibiting the second means from performing the driving force reduction control.

In another aspect of the invention, the driving force control apparatus comprises first means sensitive to driving slip of the driving wheels for producing a first signal when driving slip is sensed, second means responsive to the first signal for reducing the driving forces applied to the driving wheels so as to decrease the driving slip of the driving wheels, third means sensitive to lateral slip of the driven wheels for producing a second signal when lateral slip is sensed, and fourth means responsive to the second signal for inhibiting the first means from producing the first signal.

In still another aspect of the invention, the driving force control apparatus comprises first means for sensing conditions of the driving and driven wheels, second means for calculating a parameter based upon the sensed conditions, the parameter representing a degree of driving slip of the driving wheels, third means for producing a first signal when the calculated parameter exceeds a threshold value, fourth means responsive to the first signal for reducing the driving forces applied to the driving wheels so as to decrease the driving slip of the driving wheels, fifth means sensitive to lateral slip of the driven wheels for producing a second signal when lateral slip is sensed, and sixth means responsive to the second signal for increasing the threshold value.

BRIEF DESCRIPTION OF THE DRAWINGS

This invention will be described in greater detail by reference to the following description taken in connection with the accompanying drawings, in which.

DETAILED DESCRIPTION OF THE INVENTION

Figure 1:
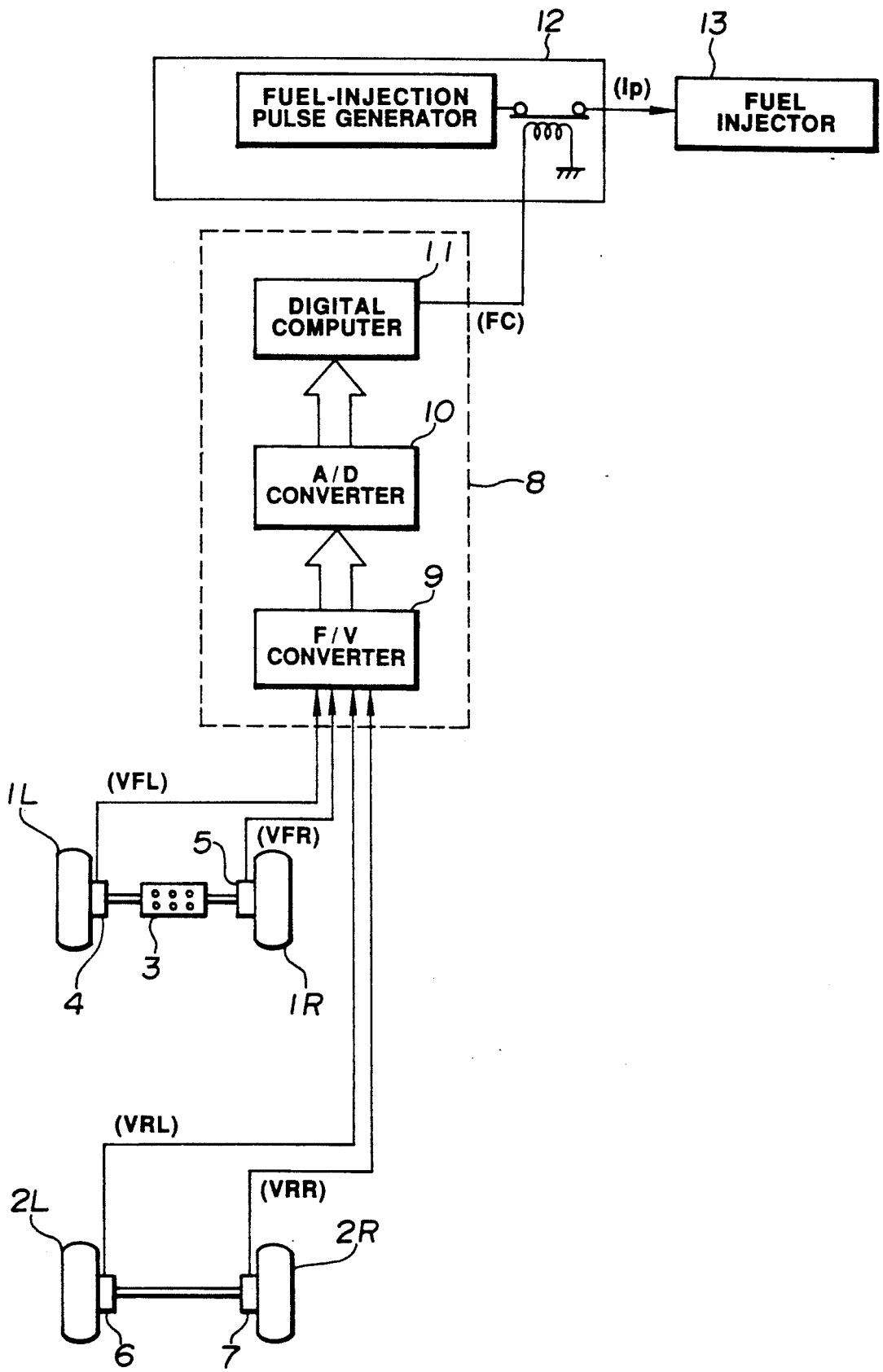
FIG. 1 is a schematic diagram of a driving force control apparatus embodying the invention.

With reference to the drawings, and in particular to FIG. 1, there is shown a schematic diagram of a driving force control apparatus embodying the invention. The driving force control apparatus will be described in connection with an automotive vehicle supported on a pair of front wheels 1L and 1R spaced laterally apart at equal distances from a vehicle longitudinal axis and a pair of rear wheels 2L and 2R spaced laterally apart at equal distances from the vehicle longitudinal axis. In the illustrated case, the automotive vehicle is of the front-wheel-drive type having an engine 3 from which the drive is transmitted to the front wheels (driving wheels) 1L and 1R.

Wheel revolution speed sensors 4, 5, 6 and 7 are positioned adjacent the respective wheels 1L, 1R, 2L and 2R to sense the revolution speeds VFL, VFR, VRL, VRR of the respective wheels 1L, 1R, 2L and 2R. Each of the wheel revolution speed sensors 4, 5, 6 and 7 produces a series of electrical pulses of a repetition rate directly proportional to the revolution speed of the corresponding one of the wheels 1L, 1R, 2L and 2R.

The numeral 8 designates a driving force control section including a frequency-to-voltage (F/V) converter 9, an analog-to-digital (A/D) converter 10 and a digital computer 11. The F/V converter 9 receives the electrical pulse signals fed from the wheel revolution speed sensors 4, 5, 6 and 7 and converts them into corresponding voltage signals. The converted voltage signals are then applied to the A/D converter 10 where they are converted into digital form for application to the digital computer 11. The digital computer 11 includes a central processing unit (CPU), a random access memory (RAM), and a read only memory (ROM). The central processing unit communicates with the rest of the computer via data bus. The read only memory contains the programs for operating the central processing unit and further contains appropriate data used in controlling the driving forces transmitted to the front wheels 1L and 1R.

The central processing unit checks the presence of driving slip of the front wheels (driving wheels) 1L and 1R based upon the data related to the revolution speeds of the wheels 1L, 1R, 2L and 2R and it provides a driving force reduction control (retraction control) to reduce the driving force applied to the front wheels 1L and 1R by producing a fuel-cut command signal FC to a fuel delivery control unit 12 in the presence of driving slip of the front wheels 1L and 1R. The central processing unit also checks lateral slip of the rear wheels 2L and 2R based upon the data related to the revolution speeds of the wheels 1L, 1R, 2L and 2R and it inhibits the driving force reduction control by interrupting the fuel-cut command signal FC to the fuel delivery control unit 12 regardless of the driving slip of the front wheels 1L and 1R.

The fuel delivery control unit 12 produces fuel-injection pulses Ip to control a fuel injector 13 provided in the engine 3. The amount of fuel metered to the engine, this being determined by the width of the fuel-injection pulses Ip applied to the fuel injector 13 is repetitively determined in the fuel delivery control unit 12 based upon engine load and other conditions of the engine that are sensed during its operation. The fuel delivery control unit 12 is arranged to interrupt the fuel-injection pulses Ip to the fuel injector 13 in response to the fuel-cut command signal FC fed thereto from the computer 11.

Although the engine 3 as illustrated in FIG. 1 shows only one fuel injector 13, nevertheless it should be understood that the particular driving force control apparatus described herein is designed for use on a multi-cylinder engine. Thus, it should be understood that the fuel delivery control unit is arranged to drive a plurality of fuel injectors. The number of the fuel injectors is equal to the number of the cylinders of the engine. It is to be understood, of course, that the invention is equally applicable to engines of the type employing a single fuel injector for supplying fuel to a plurality of cylinders.

Figure 2:
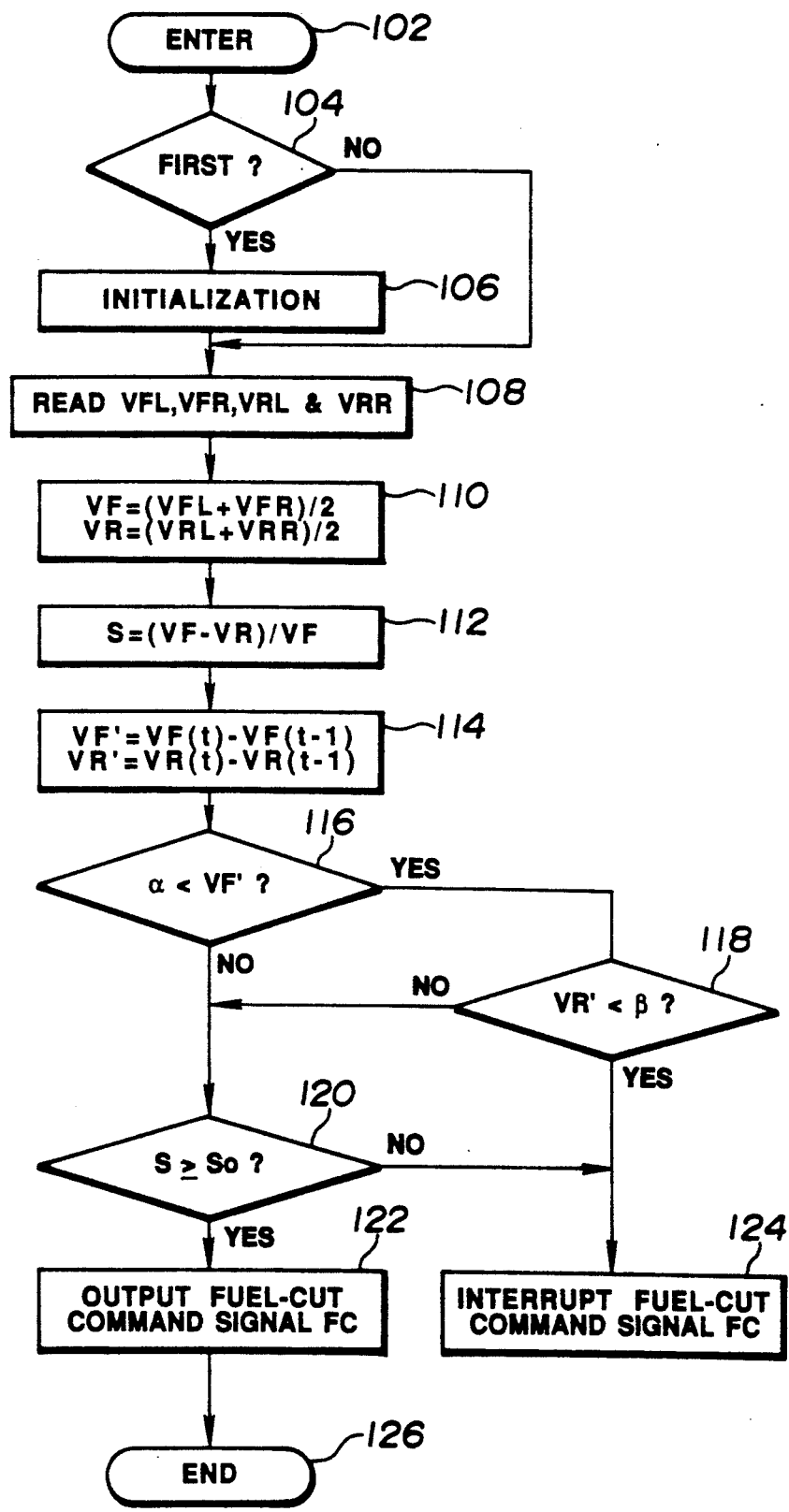
FIG. 2 is a flow diagram showing the programming of the digital computer used in the driving force control apparatus of FIG. 1.

FIG. 2 is a flow diagram illustrating the programming of the digital computer. The computer program is entered at the point 102 at uniform intervals of time. At the point 104 in the program, a determination is made as to whether or not this cycle of execution of this program is the first after the digital computer is newly powered. If the answer to this question is "yes", then the program proceeds to the point 106 where initialization is made for the random access memory. Otherwise, the program jumps the point 106 to the point 108.

At the point 108 in the program, the existing wheel revolution speed values VFL, VFR, VRL and VRR are read into the random access memory. For this purpose, the wheel revolution speed pulse signals are, one by one, converted by the F/V and A/D converters 9 and 10 and read into the random access memory. At the point 110 in the program, the central processing unit calculates an average revolution speed value VF of the front wheels 1L and 1R as $VF = (VFL + VFR)/2$ and also an average revolution speed value VR of the rear wheels 2L and 2R as $VR = (VRL + VRR)/2$. The calculated average revolution speed values VF and VR are stored in the random access memory. At the point 112 in the program, a slip ratio S is calculated as $S = (VF - VR)/VF$.

The program then proceeds to a point 114 where the central processing unit calculates a difference VF′ of the last value VF(t−1) of the front-wheel average revolution speed from the new value VF(t) of the front-wheel average revolution speed and it calculates a difference VR′ of the last value VR(t−1) of the rear-wheel average revolution speed from the new value VR(t) of the rear-wheel average revolution speed. The new values VF(t) and VR(t) have been calculated and stored in the present cycle of execution of the program and the last values VF(t−1) and VR(t−1) have been calculated and stored in the last cycle of execution of the program. Thus, the calculated difference VF′ means the rate of change of the front-wheel average revolution speed VF and the calculated difference VR′ means the rate of change of the rear-wheel average revolution speed VR.

At the point 116 in the program, a determination is made as to whether or not the calculated front-wheel average revolution speed changing rate VF′ is greater than a first predetermined negative threshold value $\alpha$ (for example, −5 km/h/500 msec). If the answer to this question is "yes", then the program proceeds to the point 118. Otherwise, the program proceeds to the point 120. At the point 118 in the program, a determination is made as to whether or not the calculated rear-wheel average revolution speed changing rate VR′ is less than a second predetermined negative threshold value $\beta$ (for example, −5 km/h/500 msec). If the answer to this question is "yes", then it means that the rate of decrease of the rear-wheel average revolution speed VF is greater than the rate of decrease of the front-wheel average revolution speed VR since the first and second threshold values $\alpha$ and $\beta$ are equal; that is, lateral slip of the rear wheels (driven wheels) occurs and the program proceeds to the point 124 where the central processing unit inhibits the fuel-cut command signal FC from being applied to the fuel delivery control unit 12. Otherwise, the program proceeds to the point 120.

At the point 120 in the program, a determination is made as to whether or not the calculated slip ratio S is equal to or greater than a predetermined threshold value So. If the answer to this question is "yes", then it means that driving slip of the front wheels 1L and 1R occurs and the program proceeds to the point 122 where the central processing unit produces the fuel-cut command signal FC to the fuel delivery control unit 12 which thereby interrupts the fuel-injection pulses Ip to the fuel injector 13 so as to decrease the driving force transmitted to the front wheels 1L and 1R. Following this, the program proceeds to the end point 126.

If S<So, then it means that no driving slip occurs and the program proceeds from the point 120 to the point 124 where the central processing unit inhibits the fuel-cut command signal FC from being applied to the fuel delivery control unit 12. Following this, the program proceeds to the end point 126.

The operation of the drive force control apparatus will be described with reference to the graph of FIG. 3. When the accelerator pedal is depressed, both of the front- and rear-wheel average revolution speeds VF and VR increase as time progresses. These average revolution speed increases continue after the accelerator pedal is released to place the engine into a coasting condition until time t1, on the graph of FIG. 3, at which the front- and rear-wheel average revolution speeds VF and VR are equalized. Prior to time t1, the front-wheel average revolution speed changing rate VF′ is positive and greater than the negative threshold value $\alpha$ and the rear-wheel average revolution speed changing rate VR′ is positive and greater than the negative threshold value $\beta$. Consequently, the fuel-cut command signal FC is interrupted when the slip ratio S is equal to or greater than the threshold value So, whereas the fuel-cut command signal FC is applied to interrupt the fuel delivery to the engine when the slip ratio S is less than the threshold value So. This means that the driving force control apparatus performs the driving force reduction control (traction control) prior to time t1.

After time t1, both of the front- and rear-wheel average speeds VF and VR decrease. When the accelerator pedal is depressed again, the front-wheel average speed VF increases until time t2, on the graph of FIG. 3, at which it reaches a peak. It is now assumed that, during the interval between times t1 and t2, the front-wheel average speed changing rate VF′ is held greater than the negative threshold value $\alpha$ and the rear-wheel average speed changing rate VR′ is held less than the negative threshold value $\beta$, as shown in FIG. 3. This assumed condition occurs when the rear wheels 2L and 2R move in a direction different from the direction of movement of the vehicle and they move outwardly of the circle in which the vehicle is turning at speeds higher than the front wheels 1L and 1R; that is, when the rear wheels 2L and 2R slip laterally. Consequently, the fuel-cut command signal FC is interrupted regardless of the slip ratio S. This means that the driving force control apparatus inhibits the driving force reduction control. This is effective to increase the degree of driving slip of the front wheels (driving wheels) 1L and 1R so as to increase the tendency of the front wheels 1L and 1R to race. Therefore, it is possible to decrease the cornering force and the spinning moment so as to minimize the tendency of the vehicle to spin.

After time t2, the front-wheel average revolution speed VF decreases rapidly in such a manner that the front-wheel average revolution speed changing rate VF′ is less than the negative threshold value a. Consequently, the fuel-cut command signal FC is interrupted when the slip ratio S is equal to or greater than the threshold value So and the fuel-cut command signal FC is applied to interrupt the fuel delivery to the engine when the slip ratio S is less than the threshold value So. This means that the driving force reduction control is restored after time t2.

After time t2, the front-wheel average revolution speed VF starts increasing at time t3. Since the rear-wheel average revolution speed VR is increasing at time t3, the fuel-cut command signal FC is interrupted when the slip ratio S is equal to or greater than the threshold valve So and the fuel-cut command signal FC is applied to interrupt the fuel delivery to the engine when the slip ratio S is less than the threshold value So. This means that the driving force reduction control continues.

Figure 4:
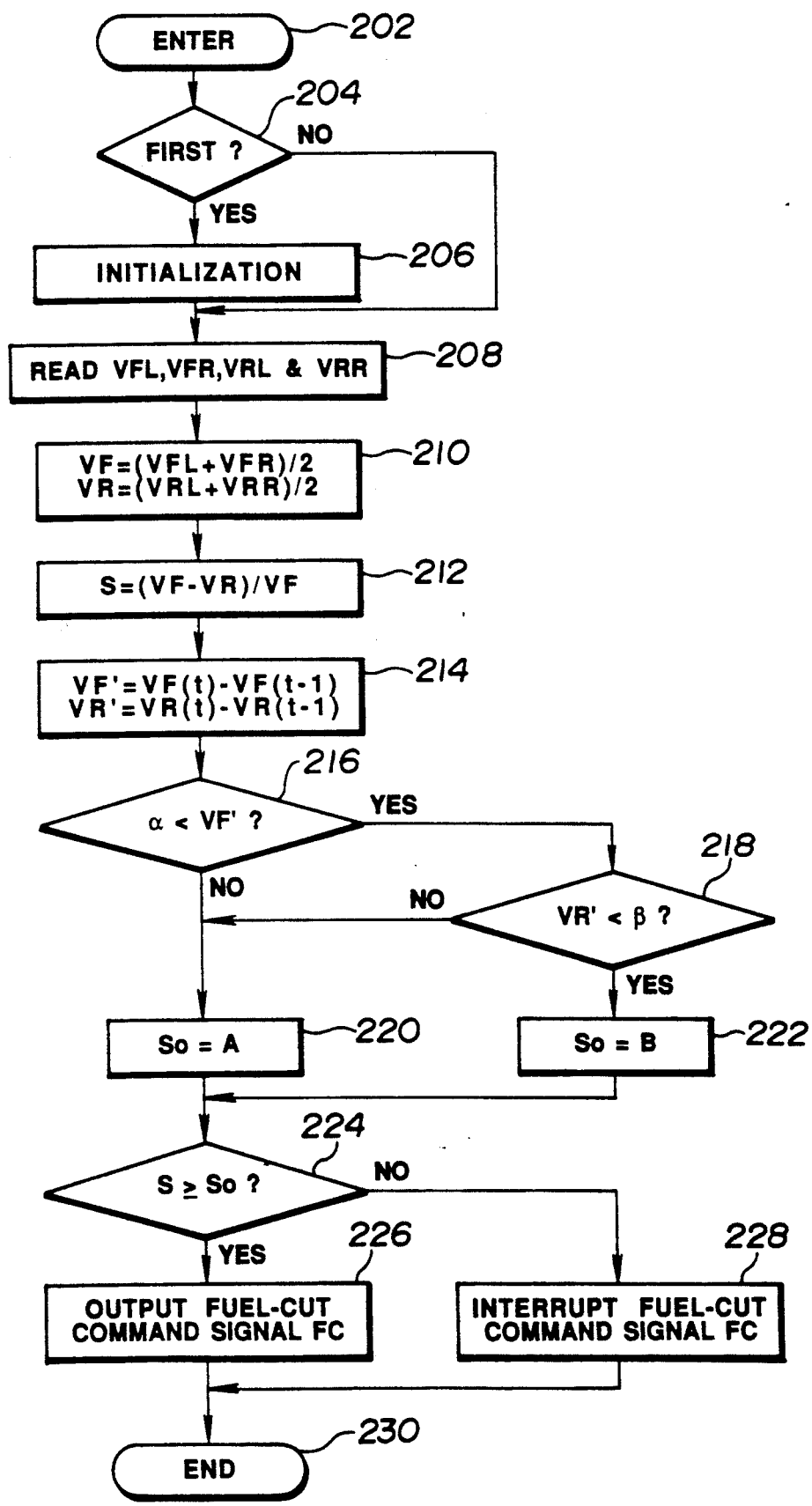
FIG. 4 is a flow diagram showing a modified form of the programming of the digital computer used in the driving force control apparatus of FIG. 1.

FIG. 4 is a flow diagram illustrating a modified form of the programming of the digital computer. The computer program is entered at the point 202 at uniform intervals of time. At the point 204 in the program, a determination is made as to whether or not this cycle of execution of this program is the first after the digital computer is newly powered. If the answer to this question is "yes", then the program proceeds to the point 206 where initialization is made for the random access memory. Otherwise, the program jumps the point 206 to the point 208.

At the point 208 in the program, the existing wheel revolution speed values VFL, VFR, VRL and VRR are read into the random access memory. For this purpose, the wheel revolution speed pulse signals are, one by one, converted by the F/V and A/D converters 9 and 10 and read into the random access memory. At the point 210 in the program, the central processing unit calculates an average revolution speed value VF of the front wheels 1L and 1R as VF=(VFL+VFR)/2 and also an average revolution speed value VR of the rear wheels 2L and 2R as VR=(VRL+VRR)/2. The calculated average revolution speed values VF and VR are stored in the random access memory. At the point 212 in the program, a slip ratio S is calculated as S=(VF−VR)/VF.

The program then proceeds to a point 214 where the central processing unit calculates a difference VF′ of the last value VF(t−1) of the front-wheel average revolution speed from the new value VF(t) of the front-wheel average revolution speed and it calculates a difference VR′ of the last value VR(t−1) of the rear-wheel average revolution speed from the new value VR(t) of the rear-wheel average revolution speed. The new values VF(t) and VR(t) have been calculated and stored in the present cycle of execution of the program and the last values VF(t−1) and VR(t−1) have been calculated and stored in the last cycle of execution of the program. Thus, the calculated difference VF′ means the rate of change of the front-wheel average revolution speed VF and the calculated difference VR′ means the rate of change of the rear-wheel average revolution speed VR.

At the point 216 in the program, a determination is made as to whether or not the calculated front-wheel average revolution speed changing rate VF′ is greater than a first predetermined negative threshold value $\alpha$ (for example, −5 km/h/500 msec). If the answer to this question is "yes", then the program proceeds to the point 218. Otherwise, the program proceeds to the point 220. At the point 218 in the program, a determination is made as to whether or not the calculated rear-wheel average revolution speed changing rate VR′ is less than a second predetermined negative threshold value $\beta$ (for example, −5 km/h/500 msec). If the answer to this question is "yes", then it means that the rate of decrease of the rear-wheel average revolution speed VF is greater than the rate of decrease of the front-wheel average revolution speed VR since the first and second threshold values $\alpha$ and $\beta$ are equal; that is, lateral slip of the rear wheels (driven wheels) occurs and the program proceeds to the point 222 where a predetermined value B (for example, 0.5) is set for a threshold value So and then to the point 224. At the point 220 in the program, a predetermined value A (for example, 0.1) smaller than the predetermined value B is set for the threshold value So and then to the point 224.

At the point 224 in the program, a determination is made as to whether or not the calculated slip ratio S is equal to or greater than the threshold value So set at the point 220 or 222. If the answer to this question is "yes", then it means that driving slip of the front wheels 1L and 1R occurs and the program proceeds to the point 226 where the central processing unit produces the fuel-cut command signal FC to the fuel delivery control unit 12 which thereby interrupts the fuel-injection pulses Ip to the fuel injector 13 so as to decrease the driving force transmitted to the front wheels 1L and 1R. Following this, the program proceeds to the end point 230.

If $S < So$, then the program proceeds from the point 224 to the point 228 where the central processing unit inhibits the fuel-cut command signal FC from being applied to the fuel delivery control unit 12. Following this, the program proceeds to the end point 230.

Figure 3:
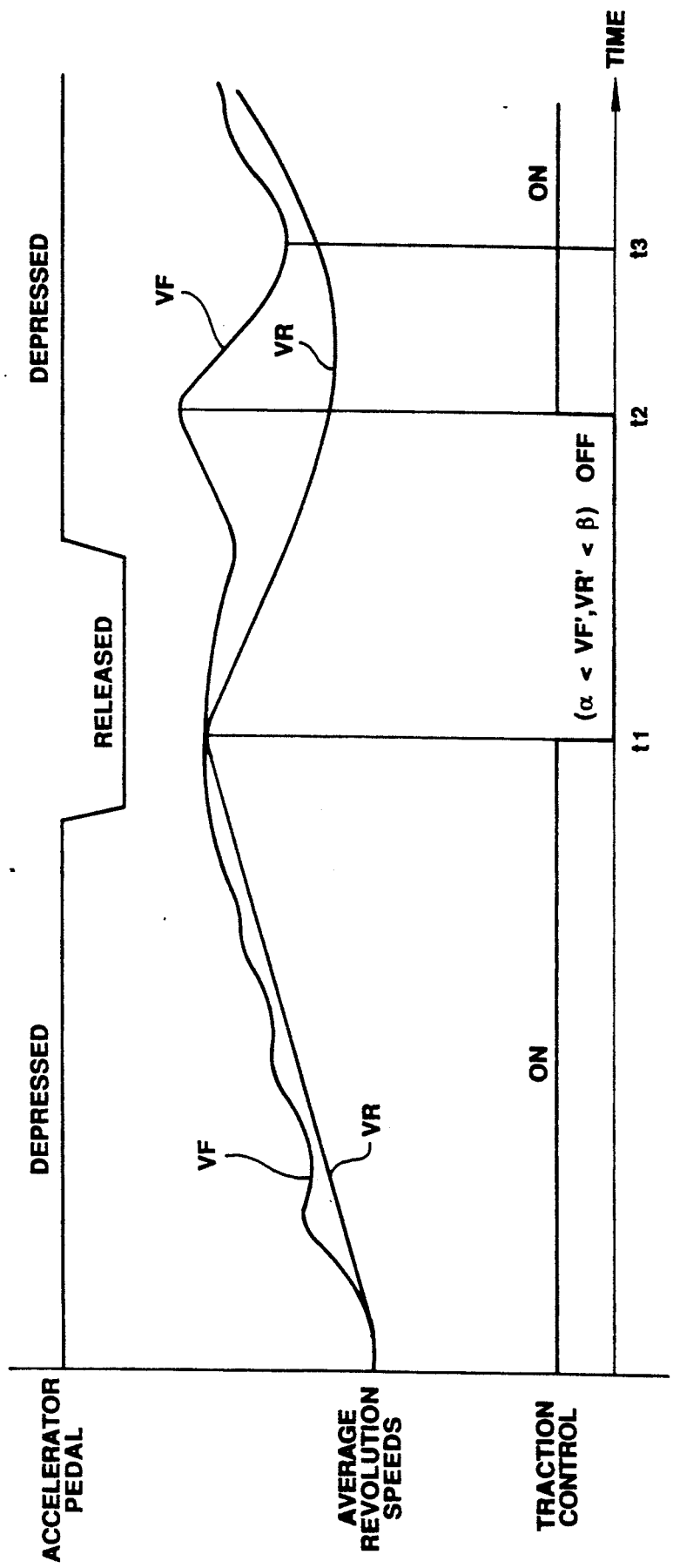
FIG. 3 is a graph used in explaining the operation of the driving force control apparatus of the invention.

In the modified form, the threshold value S is set at a first value A prior to time t1 on the graph of FIG. 3 and after time t2 on the graph of FIG. 3 and it is set at a second, greater value B in the interval between times t1 and t2. Consequently, the driving force control apparatus inhibits the traction control in the interval between times t1 and t2. Thus, the modified form has substantially the same effect as described in connection with FIG. 2.

Although the invention has been described to reduce the driving forces applied on the driving wheels by interrupting the fuel delivery to the engine, it is to be understood that the driving force reduction control (traction control) may be made by other techniques, such as by electrically controlling the throttle valve of the engine or applying braking forces directly to the wheel cylinders of the driving wheels.

Although the invention has been described to check lateral slip of the driven wheels based upon the revolution speeds of the front and rear wheels, it is to be understood that the driven wheel lateral slip may be detected when a rapid yaw rate increase occurs for almost no steering angle change.

According to the invention, the driving force reduction control is inhibited when lateral slip of the driven wheels is detected. This is effective to increase the degree of driving slip of the driving wheels so as to increase the tendency of the driving wheels to race. Therefore, it is possible to decrease the cornering force and the spinning moment so as to minimize the tendency of the vehicle to spin.

What is claimed is:

1. A driving force control apparatus for use with an automotive vehicle supported on driving wheels and driven wheels, the vehicle including an engine for applying driving forces to the driving wheels, the apparatus comprising:

first means sensitive to driving slip of the driving wheels for producing a first signal when driving slip is sensed, the first means including means for sensing revolution speeds of the driving and driven wheels;

second means responsive to the first signal for performing a driving force reduction control to reduce the driving forces applied to the driving wheels so as to decrease the driving slip of the driving wheels;

third means sensitive to lateral slip of the driven wheels for producing a second signal, the third means including means for calculating a rate of change of the driving wheel revolution speed based upon the sensed revolution speeds of the driving wheels and a rate of change of the driven wheel revolution speed based upon the sensed revolution speeds of the driven wheels, the third means including means for comparing the calculated driving wheel revolution speed changing rate with a first predetermined negative threshold value and the calculated driven wheel revolution speed changing rate with a second predetermined negative threshold value, and means for producing the second signal when the calculated driving wheel revolution speed changing rate is greater than the first predetermined negative threshold value and when the calculated driven wheel revolution speed changing rate is less than the second predetermined negative threshold value; and fourth means responsive to the second signal for inhibiting the second means from performing the driving force reduction control.

2. The driving force control apparatus as claimed in claim 1, wherein the first means includes means for sensing conditions of the driving and driven wheels, means for calculating a parameter based upon the sensed conditions, the parameter representing a degree of driving slip of the driving wheels, and means for producing the first signal when the calculated parameter exceeds a threshold value.

3. The driving force control apparatus as claimed in claim 2, wherein the fourth means includes means responsive to the second signal for increasing the threshold value.

4. The driving force control apparatus as claimed in claim 2, wherein the fourth means includes means for setting the threshold value at a first predetermined value in the absence of the second signal, and means responsive to the second signal for setting the threshold value at a second predetermined value greater than the first predetermined value.

5. The driving force control apparatus as claimed in claim 1, wherein the first means includes means for calculating a parameter based upon the sensed revolution speeds, the parameter representing a degree of driving slip of the driving wheels, and means for producing the first signal when the calculated parameter exceeds a threshold value.

6. The driving force control apparatus as claimed in claim 5, wherein the first predetermined negative threshold value is equal to the second predetermined negative threshold value.

7. The driving force control apparatus as claimed in claim 5, wherein the fourth means includes means responsive to the second signal for increasing the threshold value.

8. The driving force control apparatus as claimed in claim 5, wherein the fourth means includes means for setting the threshold value at a first predetermined value in the absence of the second signal, and means responsive to the second signal for setting the threshold value at a second predetermined value greater than the first predetermined value.

9. The driving force control apparatus as claimed in claim 1, wherein the second means performs the driving force reduction control by interrupting fuel delivery to the engine.

10. A driving force control apparatus for use with an automotive vehicle supported on driving wheels and driven wheels, the vehicle including an engine for applying driving forces to drive the driving wheels, the apparatus comprising:

first means sensitive to driving slip of the driving wheels for producing a first signal when driving slip is sensed, the first means including means for sensing revolution speeds of the driving and driven wheels;

second means responsive to the first signal for reducing the driving forces applied to the driving wheels so as to decrease the driving slip of the driving wheels;

third means sensitive to lateral slip of the driven wheels for producing a second signal, the third means including means for calculating a rate of change of the driving wheel revolution speed based upon the sensed revolution speeds of the driving wheels and a rate of change of the driven wheel revolution speed based upon the sensed revolution speeds of the driven wheels, and means for producing the second signal when the calculated driving wheel revolution speed changing rate is greater than a first predetermined negative threshold value and when the calculated driven wheel revolution speed changing rate is less than a second predetermined negative threshold value; and fourth means responsive to the second signal for inhibiting the first means from producing the first signal.

11. The driving force control apparatus as claimed in claim 10, wherein the first means includes means for sensing conditions of the driving and driven wheels, means for calculating a parameter based upon the sensed conditions, the parameter representing a degree of driving slip of the driving wheels, and means for producing the first signal when the calculated parameter exceeds a predetermined threshold value.

12. The driving force control apparatus as claimed in claim 10, wherein the first means includes means for calculating a parameter based upon the sensed revolution speeds, the parameter representing a degree of driving slip of the driving wheels, and means for producing the first signal when the calculated parameter exceeds a predetermined threshold value.

13. The driving force control apparatus as claimed in claim 12, wherein the first predetermined negative threshold value is equal to the second predetermined negative threshold value.

14. The driving force control apparatus as claimed in claim 10, wherein the second means includes means responsive to the first signal for interrupting fuel delivery to the engine.

15. A driving force control apparatus for use with an automotive vehicle supported on driving wheels and driven wheels, the vehicle including an engine for applying driving forces to drive the driving wheels, the apparatus comprising:

first means for sensing conditions of the driving and driven wheels, the first means including means for sensing revolution speeds of the driving and driven wheels;

second means for calculating a parameter based upon the sensed conditions, the parameter representing a degree of driving slip of the driving wheels;

third means for producing a first signal when the calculated parameter exceeds a threshold value;

fourth means responsive to the first signal for reducing the driving forces applied to the driving wheels so as to decrease the driving slip of the driving wheels;

fifth means sensitive to lateral slip of the driven wheels for producing a second signal, the fifth means including means for calculating a rate of change of the driving wheel revolution speed based upon the sensed revolution speeds of the driving wheels and a rate of change of the driven wheel revolution speed based upon the sensed revolution speeds of the driven wheels, and means for producing the second signal when the calculated driving wheel revolution speed changing rate is greater than a first predetermined negative threshold value and when the calculated driven wheel revolution speed changing rate is less than a second predetermined negative threshold value; and sixth means responsive to the second signal for increasing the threshold value.

16. The driving force control apparatus as claimed in claim 15, wherein the sixth means includes means for setting the threshold value at a first predetermined value in the absence of the second signal, and means responsive to the second signal for setting the threshold value at a second predetermined value greater than the first predetermined value.

17. The driving force control apparatus as claimed in claim 15, wherein the second means includes means for calculating the parameter based upon the sensed revolution speeds.

18. The driving force control apparatus as claimed in claim 17, wherein the first predetermined negative threshold value is equal to the second predetermined negative threshold value.

19. The driving force control apparatus as claimed in claim 15, wherein the fourth means includes means responsive to the first signal for interrupting fuel delivery to the engine.

* * * * *